Feb. 25, 1958 J. A. DE VRIEND ET AL 2,824,993
TUBULAR FLUORESCENT LAMP
Filed March 9, 1954

INVENTOR.
J.A. DE VRIEND
W. HONING
BY
AGENT

United States Patent Office 2,824,993
Patented Feb. 25, 1958

2,824,993

TUBULAR FLUORESCENT LAMP

Johannes Adriaan de Vriend and Wilhelm Honing, Eindhoven, Netherlands, assignors, by mesne assignments, to North American Philips Company, Inc., New York, N. Y., a corporation of Delaware Application March 9, 1954, Serial No. 414,944

Claims priority, application Netherlands March 30, 1953

8 Claims. (Cl. 313—109)

This invention relates to fluorescent lamps suitable for use in a potentially-explosive environment, such as an underground mine.

It has been found that fluorescent tubes, even if they are not connected to an electric source of supply may lead, to an explosive in the case of breakage if the tube is arranged in an explosive gas.

The fluorescent tube most commonly used is the so-called 40 watt tube which is substantially constituted by a glass cylinder or envelope having a length of about 120 cms. and an inner diameter of about 3.5 cms. and of which the inner wall is coated with a thin layer of fluorescent substances (for example halogen phosphates). The tube is closed by means of the supports for the electrodes, in most cases in the form of the so-called pinch constructions, and is filled with a rare gas (for example argon) or mixtures of rare gases at a low pressure of some millimetres (for example 3 mms.) to serve as an ionizable medium, and furthermore contains a small amount (about 25 mgs.) of mercury.

It has been found by means of extensive tests that explosion also occurred if the fluorescent layer, the electrodes, the mercury, etc. were omitted. It appeared that the presence of a gas of adequately low pressure only was sufficient for the occurrence of an explosion.

The explosive medium used consisted of mixtures of hydrogen and air at a pressure of 1 atm. containing of from 30% to 50% of hydrogen. An amount of 30% of hydrogen represents the proper stoichiometric proportion. However, mixtures having a higher content of hydrogen were found to require a lower ignition energy.

The invention relates to tubular fluorescent lamps having a thermionic electrode and containing gas at a pressure lower than the pressure of the surroundings such that in the case of breakage, if the surroundings consist of an explosive medium, the lamp could bring abount explosion of this medium.

The object of the invention is to prevent an explosion resulting from breakage of the lamp.

The invention is based on the following observation and recognitions.

The explosive gas which has penetrated the lamp upon breakage thereof is ignited in the lamp at the extremity which is not broken. The ignition might be attributable to the more or less adiabatic compression of the filling gas (for example argon of 3 mms. pressure) up to the pressure of the inflowing gas (which is in most cases 760 mms.) and possibly even to a pressure which is still higher.

Another explanation for the ignition of the explosive gas could be found in the occurrence of a shock wave, since in the case of breakage of the lamp the gas surrounding the lamp flows at a very high speed, in accordance with the large difference in pressure, into the lamp. The variation in pressure propagates in the lamp with a steep wave-front at a velocity which may be greater than that of sound. In this wave very high temperatures (some thousands degrees of K.) may occure which can probably reach still higher values due to reflection at the closed extremity of the lamp.

The fact that, for whatever reasons, higher temperatures occur may be observed by a luminous phenomenon at the closed extremity of the lamp if it is broken in a non-explosive atmosphere, for example, air.

According to the invention, filling masses are provided in the lamp at two areas between the electrodes and the corresponding extremities of the lamp, which filling masses cause the flow of the gases to be changed in such manner that explosion is avoided.

The filling mass may have a fibrous structure and may consists of, for example, glass wool or metal wool.

The filling mass may alternatively consist of foil material the surface of which is substantially parallel to the axis of the lamp, it being possible for the foil material to be repeatedly folded with the folding edges parallel to the axis of the lamp.

Furthermore, the filling mass may consist of thin tubes having their axes substantially parallel to the axis of the lamp.

It has been found that the flow of the gases is changed sufficiently if in glass tubes having a length of 120 cms. and an inner diameter of 3.5 cms. the filling mass in the form of foil material or small tubes has a surface area of at least 600 cm.$^2$ parallel to the axis of the lamp and a cross-section of material at right angles to the axis of the lamp of at the most 50% of the cross-section of the space in which it is arranged, the axial flow-through apertures then having to be larger than about 1.8 mm.$^2$.

In order that the invention may be readily carried into effect, it will now be described with reference to the accompanying drawing showing, by way of example, some embodiments thereof.

Figure 1:
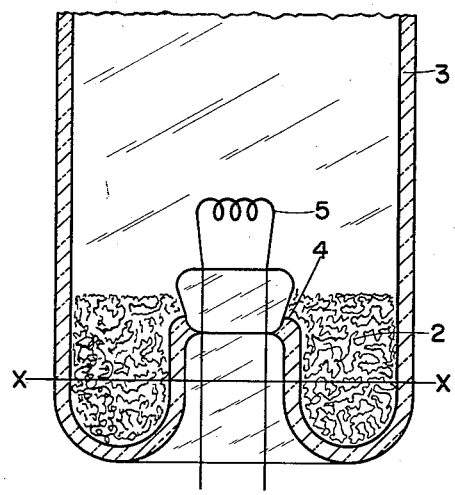
Fig. 1 is a longitudinal section of one terminal portion of a discharge lamp.

Fig. 1 is a longitudinal section of one extremity of the tubular discharge vessel 3 of a 40 watt fluorescent lamp approximately having a length of, for example, 120 cms. and an inner diameter of about 3.5 cms. The vessel is filled with a rare gas, for example argon. The pressure of the filling gas is some millimetres, for example 3 mms., of mercury. Each extremity of the discharge vessel contains a plug of glass wool 2 having a length of about 2 cms. in the direction of the axis of the lamp and a thickness of thread of about 20 microns, the mass of glass wool having a kind of structure which corresponds to a space factor of about 2%. The space factor is the relationship between the volume which occurs when the glass wool has melted to a coherent mass and the volume which is occupied by the glass wool of fibrous structure. Numeral 4 indicates the usual pinch construction having a diameter of the tube of about 1.5 cms., which serves as a supporting member for the thermionic electrode 5.

Instead of being filled with glass wool, the extremity of the lamp may be filled with metal wool or another mass.

Figure 2:
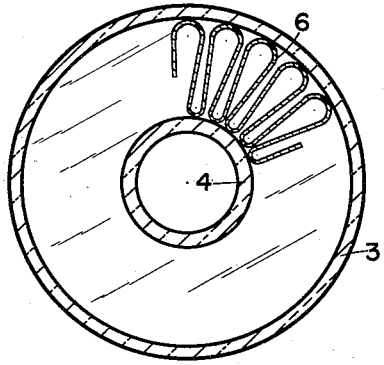
Figs. 2 to 4 are cross-sectional views at right angles to the axis of the discharge lamp along the line X—X in Fig. 1, the filling mass being formed in different ways.

In Fig. 2, the filling mass 6 consists of a copper band having a thickness of about 150 microns and a width of about 2 cms., which is externally folded with 80 bends in a star-shaped manner in the annular space between the wall 3 of the tube and the core tube 4 of the pinch construction.

Figure 3:
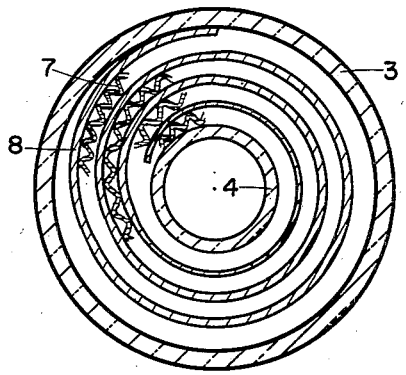

In Fig. 3, the filling mass consists of an undulated aluminum band 7 having a thickness of 100 microns, a width of 3 cms. and a wavelength of 2.7 mms., which is provided between non-undulated turns of a similar band 8. The spacing between two turns of the band 8 is about 1.3 mms.

Figure 4:
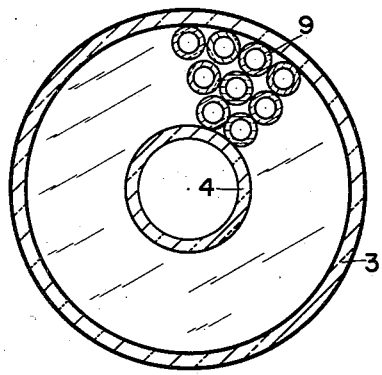

In Fig. 4, the space between the tubes 3 and 4 is filled with small glass tubes 9 having an inner diameter of about 2.5 mms. and an outer diameter of about 4 mms. and each having a length of about 4 cms., the axes of the tubes being orientated in parallel with the axis of the discharge lamp 3.

It has been found that explosion in the case of breakage of 40 watt fluorescent tubes is avoided in the embodiments shown in Figs. 2 to 4, if the filling mass has a surface area, parallel to the axis of the lamp, larger than 600 cm.$^2$ and a section of material equal to at the most half the sectional area of the annular space in which it is provided. Furthermore, the axial flow-through apertures are required to be larger than about 1.8 mm.$^2$.

It will be evident that the material of the filling mass must be chosen such that it cannot detrimentally affect the electrodes, the filling (for example the mercury), the fluorescent substances, etc.

What is claimed is:

1. A tubular fluorescent lamp adapted to operate in a potentially-explosive, gas-containing environment, comprising an envelope, a low-pressure ionizable medium within said envelope, a pair of thermionic electrodes disposed in the envelope each spaced a small distance from one end of said envelope, and a pair of filling masses each disposed within the envelope completely between one end thereof and the adjacent themionic electrode for controlling the flow of gas into the lamp due to envelope breakage to prevent explosion, each of said filling masses being electrically insulated from and free from contact with the adjacent thermionic electrode, said filling masses possessing a structure having open passages whose dimensions are such that traversal thereof by the gas in the envelope causes sufficient change in the character of the gas such that explosion becomes impossible.

2. A lamp as claimed in claim 1 in which the filling mass has a fibrous structure.

3. A lamp as claimed in claim 2 in which the filling mass consists of a member selected from the group consisting of glass wool and metal wool.

4. A lamp as claimed in claim 1 in which the filling mass consists of foil material of which the surface is substantially parallel to the axis of the lamp.

5. A lamp as claimed in claim 4, in which the foil material is repeatedly folded with the folding edges parallel to the axis of the lamp.

6. A lamp as claimed in claim 1 in which the filling mass is constituted by thin tubes having their axes substantially parallel to the axis of the lamp.

7. A lamp as claimed in claim 3, in which the space factor of the wool is about 2%.

8. A lamp as claimed in claim 4 in which the surface area of the filling mass, parallel to the axis of the lamp, is larger than 600 cm.$^2$, and the surface area of the solid material in a cross-section transverse to the axis is equal to at the most half the surface area of the space in which the mass is provided, and axial flow-through apertures in the mass are larger than 1.8 mm.$^2$.

References Cited in the file of this patent

UNITED STATES PATENTS

| | | |
|---|---|---|
| 1,467,187 | Metzger | Sept. 4, 1923 |
| 1,788,951 | Hendry | Jan. 13, 1931 |

U. S. DEPARTMENT OF COMMERCE
PATENT OFFICE

CERTIFICATE OF CORRECTION

Patent No. 2,824,993            February 25, 1958

Johannes Adriaan de Vriend et al.

It is hereby certified that error appears in the printed specification of the above numbered patent requiring correction and that the said Letters Patent should read as corrected below.

Column 1, line 20, for "explosive" read -- explosion --; line 51, for "abount" read -- about --; column 3, line 29, for "themionic" read -- thermionic --.

Signed and sealed this 15th day of April 1958.

(SEAL)
Attest:

KARL H. AXLINE            ROBERT C. WATSON
Attesting Officer            Commissioner of Patents